(12) United States Patent
Chung et al.

(10) Patent No.: US 8,298,698 B2
(45) Date of Patent: Oct. 30, 2012

(54) BATTERY PACK CASE PROVIDING IMPROVED UNIFORMITY IN COOLANT FLUX

(75) Inventors: Chae Ho Chung, Gyeonggi-do (KR); Dal Moh Kang, Daejeon (KR); Ye Hoon Im, Daejeon (KR); Jongmoon Yoon, Daejeon (KR)

(73) Assignee: LG Chem, Ltd. (KR)

( * ) Notice: Subject to any disclaimer, the term of this patent is extended or adjusted under 35 U.S.C. 154(b) by 687 days.

(21) Appl. No.: 12/321,486

(22) Filed: Jan. 21, 2009

(65) Prior Publication Data
US 2009/0311586 A1    Dec. 17, 2009

(30) Foreign Application Priority Data
Jun. 12, 2008    (KR) .................. 10-2008-0055103

(51) Int. Cl.
*H01M 10/50* (2006.01)
*H01M 2/12* (2006.01)
*F25B 21/02* (2006.01)
(52) U.S. Cl. ............. 429/120; 429/148; 429/96; 429/83
(58) Field of Classification Search .................. 429/120, 429/148
See application file for complete search history.

(56) References Cited

U.S. PATENT DOCUMENTS

| | | |
|---|---|---|
| 2003/0232239 A1 | 12/2003 | Gow et al. |
| 2006/0093901 A1* | 5/2006 | Lee et al. .................. 429/120 |

FOREIGN PATENT DOCUMENTS

| | | |
|---|---|---|
| EP | 0771037 A1 | 5/1997 |
| EP | 1750322 A2 | 2/2007 |
| KR | 20060037600 | 5/2006 |
| KR | 20060037601 | 5/2006 |
| KR | 20060037627 | 5/2006 |
| KR | 20070014662 A | 2/2007 |
| KR | 20070043242 A | 4/2007 |
| WO | 2007064088 A1 | 6/2007 |
| WO | 2007078147 A1 | 7/2007 |
| WO | 2008082111 A1 | 7/2008 |

* cited by examiner

*Primary Examiner* — Keith Walker
(74) *Attorney, Agent, or Firm* — Lerner, David, Littenberg, Krumholz & Mentlik, LLP

(57) ABSTRACT

Disclosed herein is a battery pack case in which a battery module (32) having a plurality of stacked unit cells (30) is mounted. The battery pack case is provided at an upper part and a lower part thereof with a coolant inlet port (10') and a coolant outlet port (20'), respectively. The coolant inlet port (10') and the coolant outlet port (20') are directed in opposite directions. The battery pack case is further provided with a coolant introduction part (40') and a coolant discharge part. An upper end inside part of the coolant introduction part (40') is configured in a structure in which an incline plane starting from an end opposite to the coolant inlet port (10') has an inclination increasing toward the coolant inlet port (10') with respect to the top of the cell stack.

15 Claims, 5 Drawing Sheets

*(Prior Art)*

BATTERY PACK CASE PROVIDING IMPROVED UNIFORMITY IN COOLANT FLUX

CROSS REFERENCE TO RELATED APPLICATION

This application claims the benefit of the filing date of Korean Patent Application No. 10-2008-0055103, filed Jun. 12, 2008, the disclosure of which is hereby incorporated herein by reference.

FIELD OF THE INVENTION

The present invention relates to a middle- or large-sized battery pack case providing improved distribution uniformity in coolant flux, and, more particularly, to a middle- or large-sized battery pack case in which a battery module having a plurality of stacked unit cells, which can be charged and discharged, is mounted, wherein the battery pack case is provided at an upper part and a lower part thereof with a coolant inlet port and a coolant outlet port, respectively, which are directed in opposite directions, the battery pack case is further provided with a coolant introduction part and a coolant discharge part, and an upper end inside part of the coolant introduction part facing a top of the cell stack is configured in a structure in which an incline plane starting from an end opposite to the coolant inlet port has an inclination increasing toward the coolant inlet port with respect to the top of the cell stack.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

In order for the middle- or large-sized battery module to provide power and capacity required by a predetermined apparatus or device, it is necessary for the middle- or large-sized battery module to be constructed in a structure in which a plurality of battery cells are electrically connected in series to each other, and the battery cells are stable against an external force.

Also, the battery cells constituting the middle- or large-sized battery module are secondary batteries which can be charged and discharged. Consequently, a large amount of heat is generated from the high-power, large-capacity secondary batteries during the charge and discharge of the batteries. If the heat, generated from the unit cells during the charge and discharge of the unit cells, is not effectively removed, the heat accumulates in the respective unit cells, with the result that the deterioration of the unit cells is accelerated. According to circumstances, the unit cells may catch fire or explode. For this reason, a cooling system is needed in a battery pack for vehicles, which is a high-power, large-capacity battery, to cool battery cells mounted in the battery pack.

In a middle- or large-sized battery pack including a plurality of battery cells, on the other hand, the deterioration in performance of some battery cells leads to the deterioration in performance of the entire battery pack. One of the main factors causing the nonuniformity of the performance is the nonuniformity of cooling between the battery cells. For this reason, it is required to provide a structure to secure the uniformity of cooling during the flow of a coolant.

Some conventional middle- or large-sized battery packs use a battery pack case constructed in a structure in which a coolant inlet port and a coolant outlet port are located at the upper part and the lower part of the battery pack case such that the coolant inlet port and a coolant outlet port are directed in opposite directions, and the top and bottom of a flow space extending from the coolant inlet port to the battery module are parallel to each other. In this structure, however, a relatively high coolant flux is introduced into flow channels defined between the battery cells adjacent to the coolant outlet port, whereas a relatively low coolant flux is introduced into flow channels defined between the battery cells adjacent to the coolant inlet port, with the result that it is difficult to achieve uniform cooling of the battery cells.

In connection with this matter, Korean Patent Application Publication No. 2006-0037600, No. 2006-0037601, and No. 2006-0037627 disclose a middle- or large-sized battery pack constructed in a structure in which an air guide plane is inclined downward to a side opposite to battery cells such that the air guide plane becomes closer to the battery cells with the increase in distance between the air guide plane and a coolant inlet port. Specifically, the air guide plane is inclined at an angle of 15 to 45 degrees to the side opposite to the battery cells, thereby restraining the occurrence of a phenomenon in which coolant flux is excessively introduced into flow channels defined between the battery cells adjacent to the coolant outlet port.

However, the inventors of the present application have found that the temperature deviation between the battery cells is great even in the above-described structure, with the result that it is not possible to achieve the temperature uniformity of a desired level.

Consequently, there is a high necessity for a technology to fundamentally solve the above-mentioned problems.

SUMMARY OF THE INVENTION

Therefore, the present invention has been made to solve the above problems, and other technical problems that have yet to be resolved.

As a result of a variety of extensive and intensive studies and experiments on a middle- or large-sized battery pack case, the inventors of the present application have found that, when the middle- or large-sized battery pack case is constructed in a structure in which an upper end inside part of a coolant introduction part is configured in a structure in which an incline plane starting from the end opposite to the coolant inlet port has an inclination increasing toward the coolant inlet port with respect to the top of a cell stack, it is possible to uniformly distribute the flux of a coolant flowing through flow channels defined between battery cells, with the result that heat accumulating between the battery cells is effectively removed, and therefore, the performance and life span of the battery cells are greatly improved. The present invention has been completed based on these findings.

In accordance with one aspect of the present invention, the above and other objects can be accomplished by the provision of a middle- or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions such that a coolant for cooling the unit cells can flow from one side to the other side of the battery module in the direction perpendicular to the stacking direction of the unit cells, the battery pack case is further provided with a flow space ('coolant introduction part') extending from the coolant inlet port to the battery module and another flow space ('coolant discharge part') extending from the battery module to the coolant outlet port, and an upper end inside part of the coolant introduction part facing a top of the cell stack is configured in a structure in which an incline plane starting from an end opposite to the coolant inlet port has an inclination increasing toward the coolant inlet port with respect to the top of the cell stack.

That is, in the middle- or large-sized battery pack case according to the present invention, the upper end inside part of the coolant introduction part is configured in a structure in which the incline plane starting from the end opposite to the coolant inlet port (the end located at the coolant outlet port side) has an inclination increasing toward the coolant inlet port with respect to the top of the cell stack. Consequently, it is possible to uniformly distribute the flux of a coolant flowing through the flow channels defined between the unit cells (the battery cells or the unit modules), and therefore, heat generated during the charge and discharge of the battery cells is effectively removed by the uniform flow of the coolant. As a result, it is possible to increase the cooling efficiency and to improve the operating performance of the unit cells.

Here, the expression 'the increase of the inclination' means that the incline plane located at the coolant inlet port side has an inclination greater than that of the incline plane located at the side opposite to the coolant inlet port. Consequently, the incline plane may increase continuously or discontinuously toward the coolant inlet port. Here, the expression 'the discontinuous increase' means that a region defined between the incline planes may have an inclination of 0 degrees. For example, a region having an inclination of 0 degrees with respect to the top of the cell stack may be partially formed between the neighboring incline planes.

The battery module mounted in the middle- or large-sized battery pack case according to the present invention is manufactured by stacking a plurality of unit cells with high density such that the unit cells are arranged at predetermined intervals to remove heat generated from the unit cells during the charge and discharge of the unit cells. For example, the battery cells may be sequentially stacked, such that the battery cells are arranged at predetermined intervals, without the use of additional members. Alternatively, when the battery cells have a low mechanical strength, one or more battery cells are mounted in a predetermined mounting member, and a plurality of the mounting members are stacked to construct a battery module. In the latter case, the battery module is referred to as a 'unit module' in the present invention.

When a plurality of unit modules are stacked to constitute a battery module, coolant flow channels are defined between the battery cells and/or the unit modules to effectively remove heat accumulating between the stacked battery cells.

The coolant introduction part and the coolant discharge part are flow spaces through which a coolant to effectively remove heat generated from the battery cells due to the charge and discharge of the battery cells is introduced and discharged. The coolant introduction part and the coolant discharge part are formed at the upper part and the lower part of the battery pack case, respectively, such that the coolant introduction part and the coolant discharge part are directed in opposite directions. According to circumstances, the coolant introduction part and the coolant discharge part are formed at the lower part and the upper part of the battery pack case, respectively.

The inclination of the upper end inside part of the coolant introduction part may increase toward the coolant inlet port in various structures.

In an exemplary embodiment, the upper end inside part of the coolant introduction part is configured in a structure including two or more continuous incline planes. That is, incline planes of which the inclination increases toward the coolant inlet port from the end opposite to the coolant inlet port may be formed at the upper end inside part of the coolant introduction part.

The experiments carried out by the inventors of the present application revealed that, when the upper end inside part of the coolant introduction part was configured in a structure including two or more continuous incline planes than when the upper end inside part of the coolant introduction part was parallel to the top of the cell stack or when the upper end inside part of the coolant introduction part was configured in a structure including a single incline plane, the temperature deviation between the unit cells decreased, and therefore, the performance of the unit cells was further improved.

In a specific example, the incline plane of the upper end inside part may include a first incline plane starting from the end opposite to the coolant inlet port and a second incline plane located between the first incline plane and the coolant inlet port such that the second incline plane has an inclination greater than that of the first incline plane.

In the above-described structure, the second incline plane may have an inclination 20 to 500%, preferably 100 to 300%, greater than the inclination of the first incline plane within a range in which the second incline plane has an inclination not exceeding 45 degrees with respect to the top of the cell stack. Since the inclination of the second incline plane does not exceed 45 degrees, it is possible to minimize the increase in size of the battery pack case. Also, since the inclination of the second incline plane is at least 20% greater than that of the first incline plane, it is possible to secure desirable uniformity of the coolant flux.

The first incline plane may have an inclination equal to or less than 15 degrees with respect to the top of the cell stack. Preferably, the first incline plane has an inclination of 2 to 7 degrees with respect to the top of the cell stack. More preferably, the first incline plane has an inclination of 3 to 5 degrees with respect to the top of the cell stack.

In this case, the second incline plane may have an inclination of 10 to 30 degrees with respect to the top of the cell stack within a range in which the second incline plane has an inclination not greater than that of the first incline plane.

According to circumstances, the upper end inside part of the coolant introduction part may be configured in a curve-shaped structure including substantially infinite, continuous incline planes.

Meanwhile, the coolant inlet port may have various inclinations depending upon conditions of a device in which the middle- or large-sized battery pack is mounted. For example, the coolant inlet port may have an inclination equal to or less than that of the second incline plane.

According to circumstances, when the inclination of the coolant inlet port is required to be large due to the structural limit of the device in which the middle- or large-sized battery pack is mounted, the coolant inlet port may have an inclination equal to or greater than that of the second incline plane.

The inventors of the present application experimentally confirmed that, when the upper end inside part of the coolant introduction part was configured in a specific inclined structure as previously defined, the influence of the inclination of the coolant inlet port on the uniformity of the coolant flux in the coolant flow channel was insignificant. Therefore, when the upper end inside part of the coolant introduction part is configured in a specific inclined structure as in the present invention, it is possible to freely decide the inclination of the coolant inlet port depending upon the installation conditions of a device.

In an exemplary embodiment, the coolant inlet port has an inclination of 30 to 60 degrees with respect to the top of the cell stack within a range in which the coolant inlet port has an inclination exceeding that of the second incline plane. Consequently, even when the inclination of the coolant inlet port is required to be large depending upon the conditions of a device in which the battery pack is mounted, it is possible to effectively achieve desired cooling efficiency by the provision of the characteristic structure of the upper end inside part of the coolant introduction part.

Meanwhile, the end opposite to the coolant inlet port may be spaced apart from the top of the cell stack by a height not greater than 10% of the height of the cell stack. This structure appropriately restricts the amount of the coolant reaching to the end opposite to the coolant inlet port, thereby further improving a uniform distribution effect of the coolant with respect to the unit cells.

In this case, the end opposite to the coolant inlet port may be spaced apart from the top of the cell stack by a height of 1 to 10 mm, preferably 1 to 3 mm.

The battery cells may be secondary batteries, such as nickel metal hydride secondary batteries or lithium secondary batteries. Among them, the lithium secondary batteries are preferably used because the lithium secondary batteries have high energy density and high discharge voltage. Batteries of various types such as a cylindrical battery, a prismatic battery, a pouch-shaped battery and the like can be used as a chargeable and dischargeable unit cell constituting the battery module. Among them, the prismatic battery or the pouch-shaped battery is preferable in view of the battery shape. More preferably, the pouch-shaped battery is used as the unit cell of the battery module because the pouch-shaped battery is manufactured with low manufacturing costs and light in weight.

Also, the battery pack case according to the present invention is more preferably in a structure in which the cooling efficiency is serious, i.e., a structure in which the length of the battery pack case corresponding to the stacking direction of the battery cells is greater than that of the battery pack case corresponding to the lateral direction of the battery cells.

Meanwhile, the coolant discharge part may have a uniform height with respect to the bottom of the cell stack. That is, the coolant discharge part may be constructed in a structure in which a lower end inside part of the coolant discharge part has a uniform height with respect to the bottom of the cell stack. Of course, however, the structure may be partially modified to improve the coolant discharge efficiency.

According to circumstances, the battery pack case may be constructed in a structure in which a blowing fan is further mounted in the coolant outlet port or the coolant outlet port for rapidly and smoothly moving the coolant, introduced through the coolant inlet port, to the coolant outlet port, after the coolant flows through the battery module. In this structure, the coolant, introduced through the narrow coolant inlet port, sufficiently reaches the battery cells remote from the coolant inlet port, at a high flow speed of the coolant, by a coolant driving force generated from the blowing fan, and therefore, the relatively uniform distribution of the coolant flux is achieved in the condition of the same coolant flux.

In accordance with another aspect of the present invention, there is provided a middle- or large-sized battery pack constructed in a structure in which a battery module is mounted in the middle- or large-sized battery pack case with the above-stated construction.

The term 'battery module' used in the specification inclusively means the structure of a battery system constructed in a structure in which two or more chargeable and dischargeable battery cells or unit modules are mechanically coupled and, at the same time, electrically connected to each other to provide high-power, large-capacity electricity. Therefore, the battery module itself may constitute a single apparatus or a part of the large-sized apparatus. For example, a plurality of small-sized battery modules may be connected to each other to constitute a large-sized battery module. Alternatively, a small number of battery cells may be connected to each other to constitute a unit module, and a plurality of the unit modules may be connected to each other.

Meanwhile, the unit module may be constructed in various structures, an exemplary example of which will be described hereinafter.

The unit module is constructed in a structure in which a plurality of plate-shaped battery cells, each of which has electrode terminals formed at the upper and lower ends thereof, are connected in series to each other. Specifically, the unit module may includes two or more battery cells arranged in a stacked structure in which connections between the electrode terminals of the battery cells are bent and a high-strength cell cover coupled to the battery cells for covering the outer surfaces of the battery cells excluding the electrode terminals of the battery cells.

The plate-shaped battery cells are battery cells having a small thickness and relatively large width and length to minimize the entire size of the battery cells when the battery cells are stacked to constitute a battery module. As an exemplary example, the battery cell may be a secondary battery constructed in a structure in which an electrode assembly is mounted in a battery case formed of a laminate sheet including a resin layer and a metal layer, and electrode terminals protrude outward from the upper and lower ends of the battery case. Specifically, the battery cell may be constructed in a structure in which an electrode assembly is mounted in a pouch-shaped battery case formed of an aluminum laminate sheet. The secondary battery constructed in the above-described structure may be referred to as a pouch-shaped battery cell.

A unit module may be constituted by covering two or more battery cells with a high-strength cell cover, made of a synthetic resin or a metal material. The high-strength cell cover restrains the deformation of the battery cells due to repeated expansion and contraction of the battery cells during the charge and discharge of the battery cells, while protecting the battery cells having a low mechanical strength, thereby preventing the separation between the sealing regions of the battery cells. Eventually, therefore, it is possible to manufacture a middle- or large-sized battery module having more excellent safety.

The battery cells are connected in series and/or parallel to each other in one unit module, or the battery cells of one unit module are connected in series and/or parallel to the battery cells of another unit module. In an exemplary example, a plurality of unit modules may be manufactured by coupling electrode terminals of the battery cells to each other, while arranging the battery cells in series in the longitudinal direction, such that the electrode terminals of the battery cells are successively adjacent to each other, bending the battery cells by twos or more such that the battery cells are stacked, and covering the stacked battery cells by predetermined numbers with the cell covers.

The coupling between the electrode terminals may be accomplished in various manners, such as welding, soldering, and mechanical coupling. Preferably, the coupling between the electrode terminals is accomplished by welding.

The battery cell or the unit modules, which are stacked in high integration while the electrode terminals are connected to each other, are vertically mounted in the separable upper and lower frame members that are configured to be coupled to each other in the assembly-type coupling structure to construct the rectangular battery module.

The details of the unit module and the rectangular battery module manufactured with a plurality of the unit modules are disclosed in Korean Patent Application No. 2006-45443 and No. 2006-45444, which have been filed in the name of the applicant of the present application and the disclosure of which is incorporated herein by reference.

The middle- or large-sized battery pack according to the present invention is preferably used as a power source for electric vehicles or hybrid electric vehicles, the safety of which may seriously deteriorate due to high-temperature heat generated from a plurality of battery cells combined to provide high power and large capacity, during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
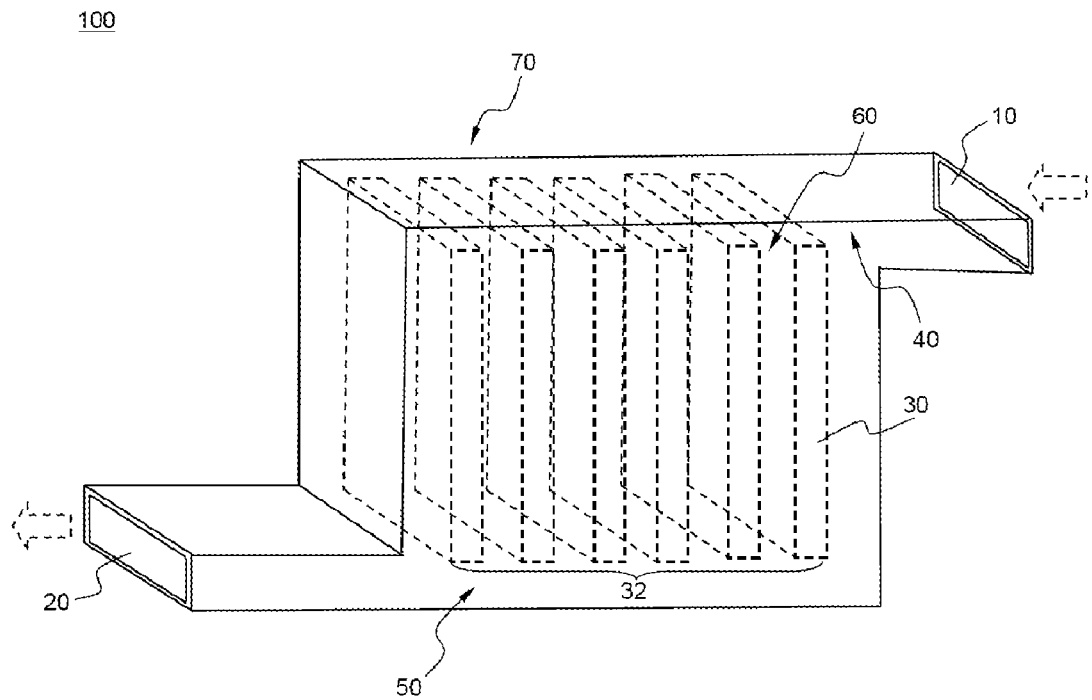
FIG. 1 is a perspective view illustrating a middle- or large-sized battery pack constructed in a structure in which a battery module is mounted in a conventional middle- or large-sized battery pack case.
Figure 2:
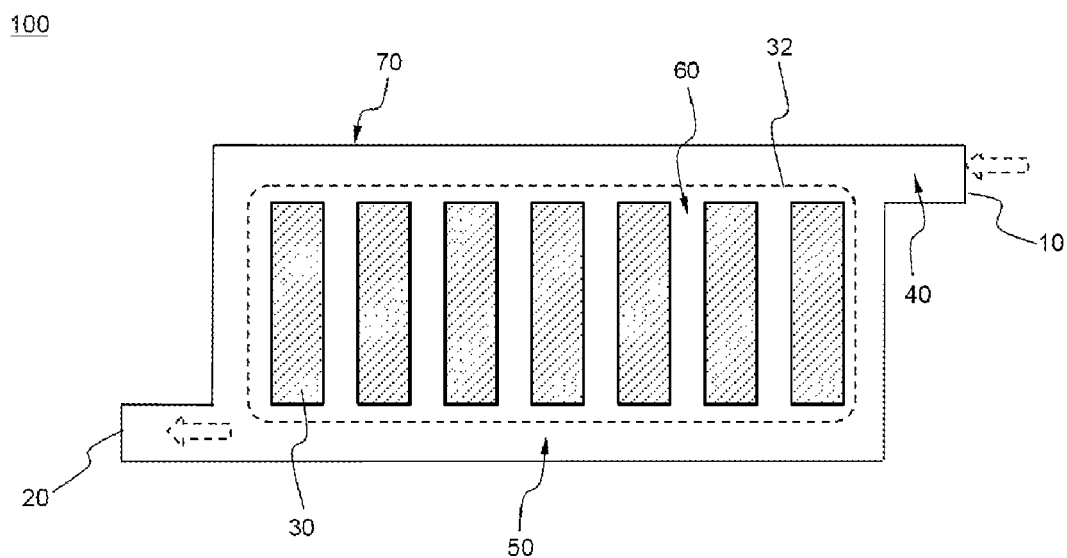
FIG. 2 is a vertical sectional view typically illustrating the middle- or large-sized battery pack of FIG. 1.

FIG. 1 is a perspective view illustrating a middle- or large-sized battery pack 100 constructed in a structure in which a battery module is mounted in a conventional middle- or large-sized battery pack case, and FIG. 2 is a vertical sectional view typically illustrating the middle- or large-sized battery pack 100 of FIG. 1.

Referring to these drawings, the middle- or large-sized battery pack 100 includes a battery module 32 constructed in a structure in which a plurality of unit cells 30 are stacked such that the unit cells 30 are electrically connected to each other, a battery pack case 70 in which the battery module 32 is mounted, a coolant introduction part 40, as a flow space, extending from a coolant inlet port 10 to the battery module 32, and a coolant discharge part 50, as another flow space, extending from the battery module 32 to a coolant outlet port 20.

A coolant, introduced through the coolant inlet port 10, flows through the coolant introduction part 40 and flow channels 60 defined between the respective unit cells 30. At this time, the coolant cools the battery cells 30. After that, the coolant flows through the coolant discharge part 50, and is then discharged out of the battery pack case through the coolant outlet port 20.

The coolant introduction part 40 is formed in parallel to the direction in which the unit cells 30 are stacked. In this structure, a relatively high coolant flux is introduced into the flow channels defined between the unit cells adjacent to the coolant outlet port 20, whereas a relatively low coolant flux is introduced into the flow channels defined between the unit cells adjacent to the coolant inlet port 10, with the result that the cooling of the unit cells 30 is nonuniformly achieved, and therefore, the temperature deviation between the unit cells adjacent to the coolant outlet port 20 and the unit cells adjacent to the coolant inlet port 10 is very high. This phenomenon occurs because the coolant concentrates on the coolant outlet port 20 side with the result that the temperature at the coolant inlet port 10 increases.

Figure 3:
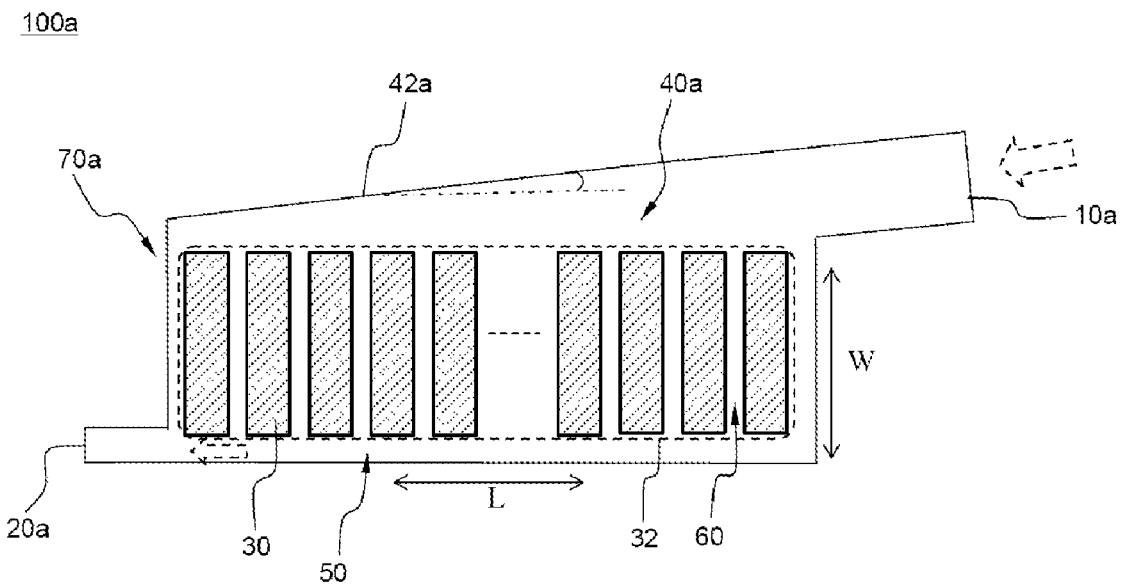
FIG. 3 is a vertical sectional view typically illustrating a middle- or large-sized battery pack constructed in a structure in which a battery module is mounted in another conventional middle- or large-sized battery pack case.

FIG. 3 is a vertical sectional view typically illustrating a middle- or large-sized battery pack 100a constructed in a structure in which a battery module is mounted in another conventional middle- or large-sized battery pack case.

The middle- or large-sized battery pack 100a of FIG. 3 is substantially identical to the middle- or large-sized battery pack 100 of FIG. 1 in connection with the battery cells 30, the battery module 32, the coolant discharge part 50, and the flow channels 60. However, the middle- or large-sized battery pack 10a of FIG. 3 is different from the middle- or large-sized battery pack 100 of FIG. 1 in that a coolant inlet port 10a and a coolant introduction part 40a are inclined at a predetermined angle to a battery pack case 70a. That is, an upper end inside part 42a of the coolant introduction part 40a is inclined at a predetermined angle toward the end of the battery pack case 70 opposite to the coolant inlet port 10a.

In this structure, the efficiency of cooling the unit cells 30 adjacent to the coolant inlet port 10a is relatively high as compared with the middle- or large-sized battery pack 100 of FIG. 1. As can be seen from FIG. 8, considerably high temperature difference still exists even in the structure of FIG. 3.

Figure 4:
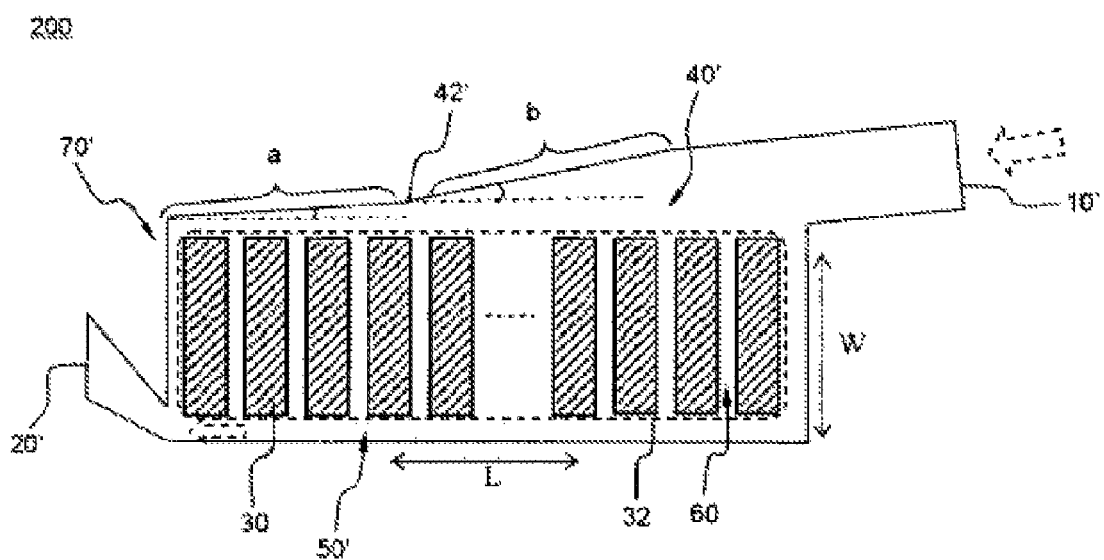
FIG. 4 is a vertical sectional view typically illustrating a middle- or large-sized battery pack constructed in a structure in which a battery module is mounted in a battery pack case according to an exemplary embodiment of the present invention.

FIG. 4 is a vertical sectional view typically illustrating a middle- or large-sized battery pack constructed in a structure in which a battery module is mounted in a battery pack case 70' according to an exemplary embodiment of the present invention.

Referring to FIG. 4, the battery pack case 70' is constructed in a structure in which the length of the battery pack case 70' corresponding to the stacking direction L of the unit cells 30 is greater than that of the battery pack case 70' corresponding to the lateral direction W of the unit cells 30. Also, a coolant inlet port 10' and a coolant outlet port 20' are formed at the upper part and the lower part of the battery pack case 70', respectively, in opposite directions such that a coolant can flow from one side to the opposite side of the battery module 32 in the direction perpendicular to the stacking direction L of the battery cells 30.

Small flow channels 60 are defined between the respective unit cells 30 such that the coolant can flow through the flow channels 60. Consequently, the coolant, introduced through the coolant inlet port 10', flows through the flow channels 60. At this time, heat generated from the unit cells 30 is removed by the coolant. After that, the coolant is discharged to the outside through the coolant outlet port 20'.

The battery pack case 70' of FIG. 4 is different from the battery pack cases 70 and 70a illustrated in FIGS. 1 and 3 in that an upper end inside part 42' of a coolant introduction part 40' is configured, in the form of an incline plane having an inclination increasing in stages. That is, the upper end inside part 42' of the coolant introduction part 40' is configured in a structure in which the inclination of the incline plane starting from the end opposite to the coolant inlet port 10' increases toward the coolant inlet port 10' with respect to the top of the cell stack. Specifically, the upper end inside part 42' of the coolant introduction part 40' includes a first incline plane a starting from the end opposite to the coolant inlet port 10' and a second incline plane b located between the first incline plane a and the coolant inlet port 10' such that the second incline plane b has an inclination greater than that of the first incline plane.

When the coolant, introduced through the coolant inlet port 10', flows through the coolant introduction part 40' along the first incline plane a and the second incline plane b, the flow sectional area of the coolant is gradually decreased by the incline planes a and b of which the inclination decreases according to the increase of the distance from the coolant inlet port 10'. As a result, the flow speed of the coolant gradually increases but the coolant flux decreases, and therefore, a uniform coolant flux is introduced into the respective flow channels 60 while the coolant reaches the unit cells 30 remote from the coolant inlet port 10'.

In order to increase the distribution uniformity of the coolant, the first incline plane a and the second incline plane b are formed at the upper end inside part 42' of the coolant introduction part 40' such that the first incline plane a has an inclination of approximately 5 degrees with respect to the top of the cell stack, and the second incline plane b has an inclination 200% greater than the inclination of the first incline plane a, i.e., an inclination of approximately 10 degrees with respect to the first incline plane a.

Meanwhile, as shown in FIG. 4, the coolant inlet port 10' has an inclination less than that of the second incline plane b. Consequently, as the coolant, introduced through the coolant inlet port 10', passes through a place where the second incline plane b starts, the flow speed of the coolant gradually increases until the coolant reaches the end opposite to the coolant inlet port 10'. As a result, not only the unit cells 30 adjacent to the coolant inlet port 10' but also the unit cells 30 remote from the coolant inlet port 10' are uniformly cooled.

Also, the battery pack case 70' is configured in a structure in which the coolant introduction part 40' is inclined in stages such that the inclination of the coolant introduction part 40' gradually decreases toward the end opposite to the coolant inlet port 10'. Consequently, it is possible to prevent the occurrence of a phenomenon in which the coolant flux concentrates on the coolant outlet port 20' side, and therefore it is possible to effectively prevent the increase in temperature of the unit cells 30 adjacent to the coolant inlet port 10'.

Figure 5:
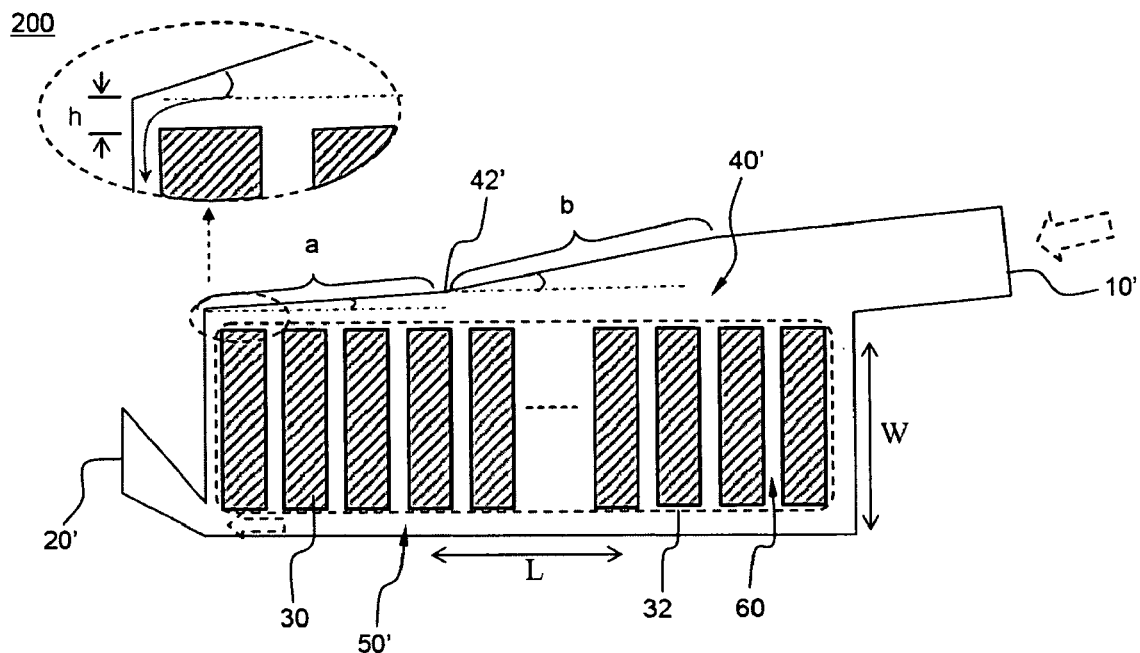
FIG. 5 is a vertical sectional view typically illustrating a structure in which the end opposite to a coolant inlet port is spaced from the top of a cell stack in the middle- or large-sized battery pack of FIG. 4.

FIG. 5 is a vertical sectional view typically illustrating a structure in which the end opposite to the coolant inlet port 10' is spaced from the top of the cell stack in the middle- or large-sized battery pack 200 manufactured in the structure of FIG. 4.

Referring to FIG. 5, the end opposite to the coolant inlet port 10' is spaced apart from the top of the cell stack by a height of approximately 1 mm. Consequently, only a restricted amount of the coolant, having passed along the second incline plane b and the first incline plane a of the coolant introduction part 40', reaches the end opposite to the coolant inlet port 10', thereby preventing the unit cells 30 adjacent to the end opposite to the coolant inlet port 10' from being excessively cooled.

Figure 6:
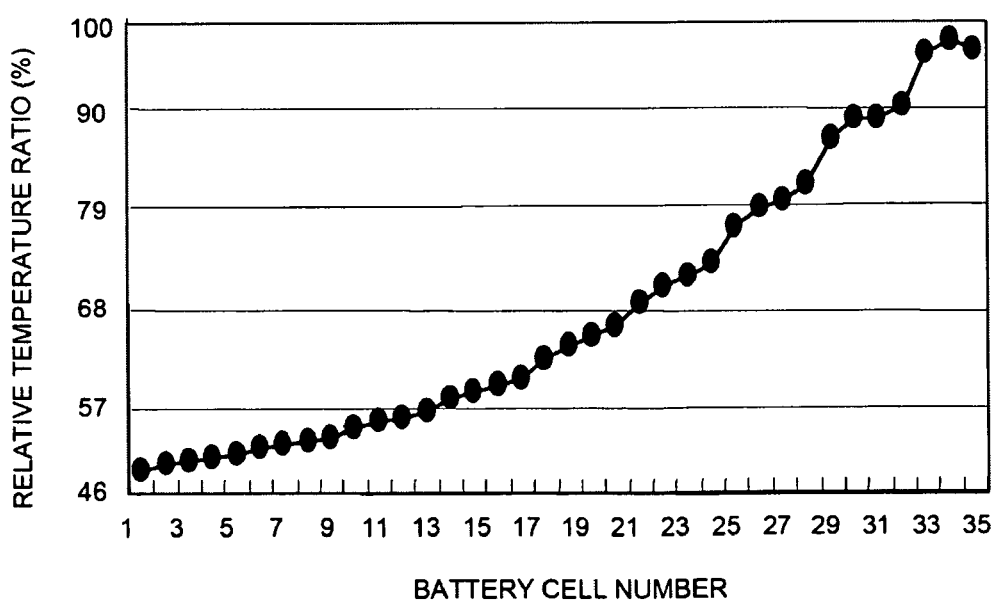
FIG. 6 is a graph illustrating the measurement results of the change in temperature of battery cells in the middle- or large-sized battery pack of FIG. 2.
Figure 7:
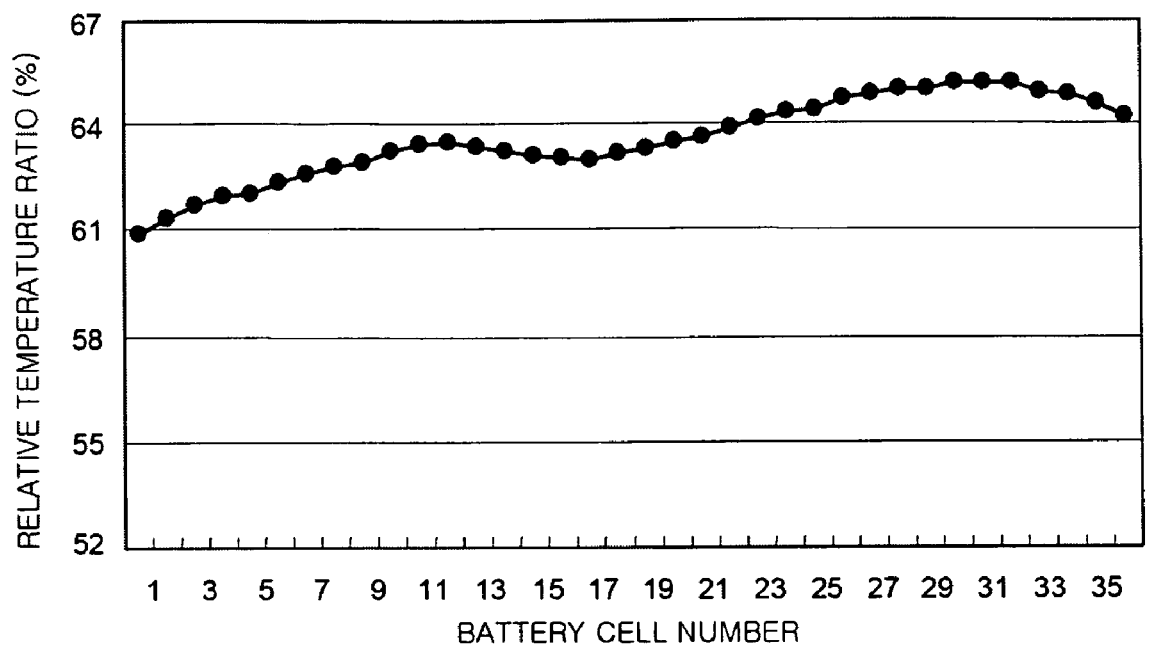
FIG. 7 is a graph illustrating the measurement results of the change in temperature of battery cells in the middle- or large-sized battery pack of FIG. 4.

In connection with the above description, FIG. 6 is a graph illustrating the measurement results of the change in temperature of battery cells in the middle- or large-sized battery pack manufactured in the structure of FIG. 2, and FIG. 7 is a graph illustrating the measurement results of the change in temperature of the battery cells in the middle- or large-sized battery pack manufactured in the structure of FIG. 4.

Referring to FIG. 6 together with FIG. 2, FIG. 6 illustrates measurement results of the temperature of the battery cells stacked in the conventional battery pack case 70 from the battery cell the most adjacent to the coolant outlet port to the battery cell the most adjacent to the coolant inlet port. That is, battery cell number 1 indicates the battery cell the most adjacent to the coolant outlet port, and battery cell number 35 indicates the battery cell the most adjacent to the coolant inlet port.

The temperature measurement tests were carried out under a condition in which a predetermined load was applied to the battery cells and the external temperature was maintained at a level of room temperature. The measurement tests revealed that battery cell number 1, i.e., the battery cell the most adjacent to the end opposite to the coolant inlet port, had a relative temperature ratio of 48%, and battery cell number 34 had a relative temperature ratio of 98%. That is, the temperature deviation between the battery cells was 50%, and the maximum relative temperature ratio of the battery cells was 98%. When the temperature of a battery cell exceeds a specific temperature level, the life span of the battery cell abruptly decreases. The high temperature and the high temperature deviation make it impossible to use the battery pack for a long period of time, and, in addition, a possibility that the battery pack will explode increases.

For reference, the above-mentioned relative temperature ratio of the battery cells was expressed as relative values that are comparable in relation to the experiment results shown in FIGS. 7 and 8, which will be described hereinafter.

In contrast to the FIG. 6, FIG. 7 illustrates measurement results of the temperature of the battery cells stacked in the battery pack case 70' of FIG. 4 from the battery cell the most adjacent to the coolant outlet port to the battery cell the most adjacent to the coolant inlet port.

Referring to FIG. 7 together with FIG. 4, the measurement tests, carried out under the same experiment condition as in FIG. 6, revealed that battery cell number 1 had a relative temperature ratio of 61%, and battery cell number 31 had a relative temperature ratio of 65%. Consequently, it can be seen that it is possible to reduce the temperature deviation from 50% to 4% as compared with FIG. 6, thereby greatly improving the temperature distribution uniformity of the coolant.

Figure 8:
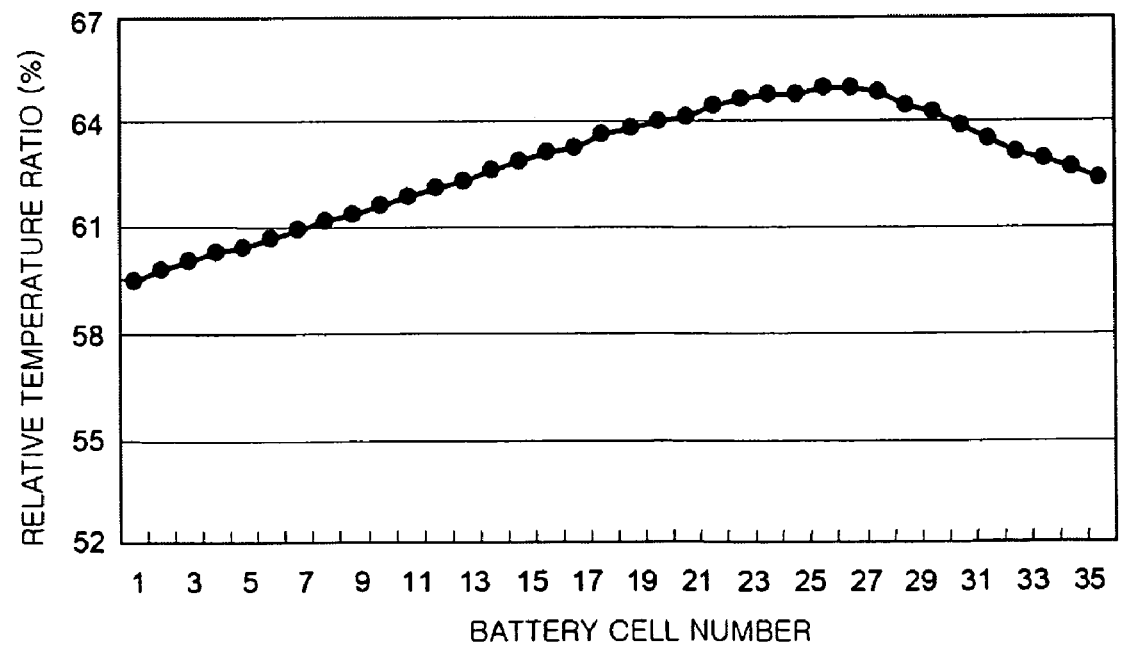
FIG. 8 is a graph illustrating the measurement results of the change in temperature of battery cells in the middle- or large-sized battery pack manufactured in the structure of FIG. 3.

FIG. 8 is a graph illustrating the measurement results of the change in temperature of battery cells in the middle- or large-sized battery pack manufactured in the structure of FIG. 3.

The experiments in connection with FIG. 8 were carried out under the same condition as in FIG. 7 except the use of the battery pack case 70a of FIG. 3. Specifically, FIG. 8 illustrates the experiment results in a structure in which the upper end inside part 43a of the coolant introduction part 40a is inclined at an angle of 30 degrees from the structure of FIG. 3.

The graph of FIG. 8 revealed that the battery cells had a relative temperature ratio deviation of 5.5%. Consequently, it can be seen that the temperature deviation of the battery cells is relatively high as compared with the results of FIG. 7.

Figure 9:
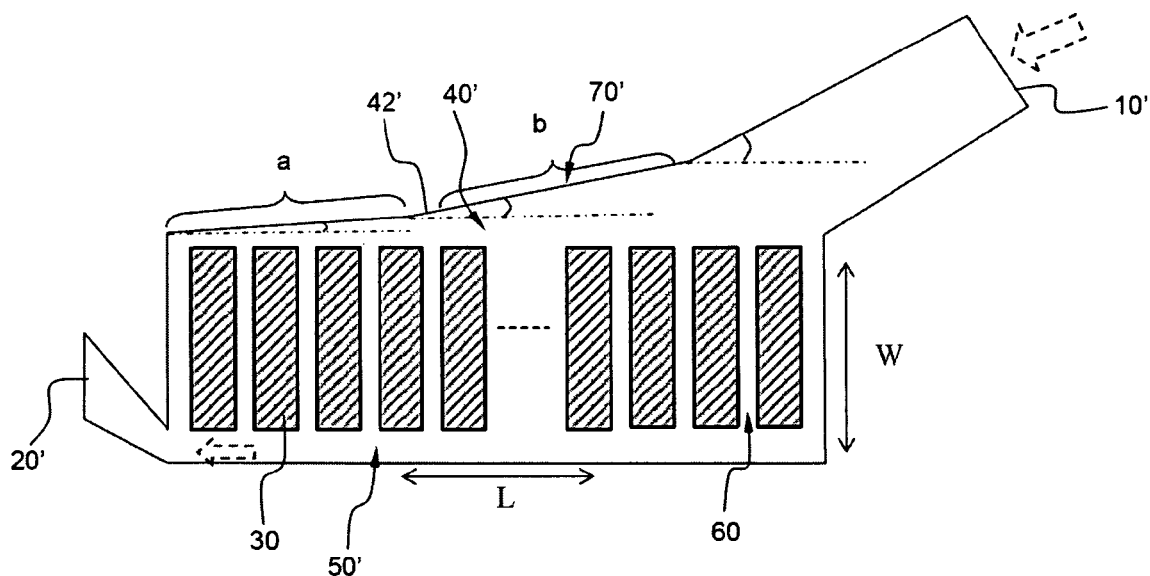
FIG. 9 is a vertical sectional view typically illustrating a middle- or large-sized battery pack constructed in a structure in which a battery module is mounted in a battery pack case according to another exemplary embodiment of the present invention.

FIG. 9 is a vertical sectional view typically illustrating a middle- or large-sized battery pack 200a constructed in a structure in which a battery module is mounted in a battery pack case according to another exemplary embodiment of the present invention.

Referring to FIG. 9, the middle- or large-sized battery pack 200a of this embodiment is identical in construction to the middle- or large-sized battery pack 200 of FIG. 4 except that the coolant inlet port 10' has an inclination of 30 degrees, which is greater than the inclination, i.e., 10 degrees, of the second incline plane b.

However, the uniform distribution of the coolant is hardly affected by the inclination of the coolant inlet port 10'. That fact can be seen from FIG. 10, which illustrates the measurement results of the change in temperature of the battery cells while variously changing the inclination of the coolant inlet port 10'. Specifically, the experiments were carried out with respect to structures in which the angle of the coolant inlet port 10' was changed to be 30 degrees, 45 degrees, and 60 degrees under a condition in which the first incline plane a had an inclination of 5 degrees, the second incline plane b had an inclination of 10 degrees, and the end opposite to the coolant inlet port 10' is spaced apart from the top of the cell stack by a height of 1 mm.

Figure 10:
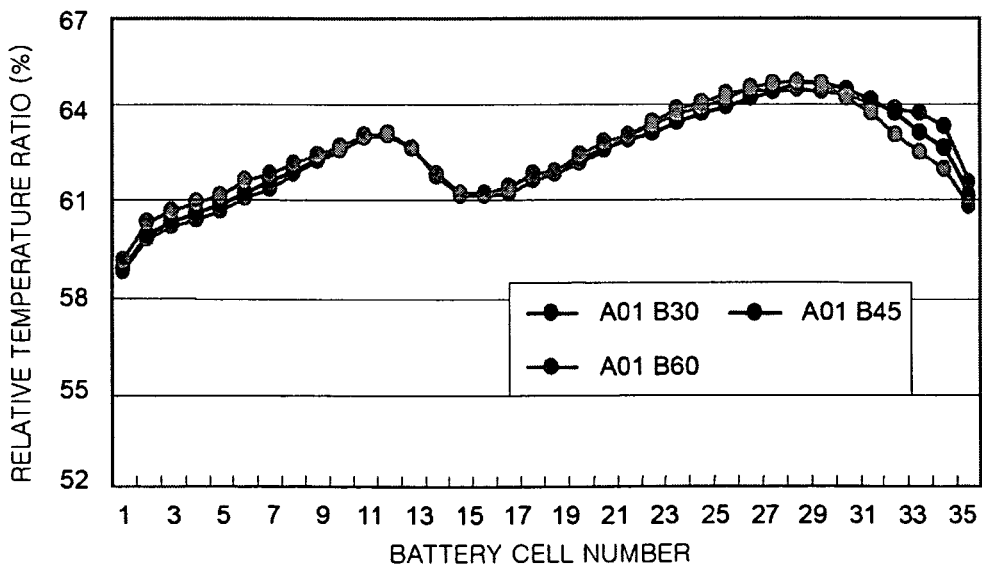
FIG. 10 is a graph illustrating the measurement results of the change in temperature of battery cells in middle- or large-sized battery packs manufactured by variously changing the inclination of a coolant inlet port from the structure of FIG. 4.

For reference, the battery cell temperature measurement tests of FIG. 10 were carried out under a condition in which an approximately 40% more higher load was applied to the respective battery cells and the external temperature was lowered by approximately 5 degrees, unlike the experiment conditions of FIGS. 6 to 8.

As can be seen from FIG. 10, there was little difference depending upon the change in inclination of the coolant inlet port 10'. Consequently, it is possible to change the inclination of the coolant inlet port 10' based on the structure of a device in which the battery pack is mounted while exhibiting a uniform cooling efficiency.

INDUSTRIAL APPLICABILITY

As apparent from the above description, the middle- or large-sized battery pack case according to the present invention is constructed in a structure in which the upper end inside part of the coolant introduction part is formed such that the inclination of the incline plane starting from the end opposite to the coolant inlet port increases toward the coolant inlet port with respect to the top of the cell stack. Consequently, the present invention has the effect of improving the distribution uniformity of coolant flux, effectively removing heat accumulating between the unit cells, and therefore, greatly improving the performance and life span of the battery cells.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A middle- or large-sized battery pack case in which a battery module having a plurality of stacked unit cells, which can be charged and discharged, is mounted, wherein
the battery pack case is provided at an upper part and a lower part thereof with a coolant inlet port and a coolant outlet port, respectively, which are directed in opposite directions such that a coolant for cooling the unit cells can flow from one side to the other side of the battery module in the direction perpendicular to the stacking direction of the unit cells,
the battery pack case is further provided with a coolant introduction part, as a flow space extending from the coolant inlet port to the battery module and a coolant discharge part, as another flow space extending from the battery module to the coolant outlet port, and
an upper end inside part of the coolant introduction part facing a top of the cell stack is configured in a structure to include a first incline plane starting from the end opposite to the coolant inlet port and a second incline plane located between the first incline plane and the coolant inlet port such that the second incline plane has an inclination greater than that of the first incline plane;
wherein the second incline plane has an inclination 20 to 500% greater than the inclination of the first incline plane within a range in which the second incline plane has an inclination not exceeding 45 degrees with respect to the top of the cell stack.

2. The middle- or large-sized battery pack case according to claim 1, wherein the upper end inside part of the coolant introduction part is configured in a structure including two or more continuous incline planes.

3. The middle- or large-sized battery pack case according to claim 1, wherein the first incline plane has an inclination equal to or less than 15 degrees with respect to the top of the cell stack.

4. The middle- or large-sized battery pack case according to claim 3, wherein the first incline plane has an inclination of 2 to 7 degrees with respect to the top of the cell stack.

5. The middle- or large-sized battery pack case according to claim 1, wherein the second incline plane has an inclination of 10 to 30 degrees with respect to the top of the cell stack within a range in which the second incline plane has an inclination exceeding that of the first incline plane.

6. The middle- or large-sized battery pack case according to claim 1, wherein the coolant inlet port has an inclination equal to or less than that of the second incline plane.

7. The middle- or large-sized battery pack case according to claim 1, wherein the coolant inlet port has an inclination equal to or greater than that of the second incline plane.

8. The middle- or large-sized battery pack case according to claim 7, wherein the coolant inlet port has an inclination of 30 to 60 degrees with respect to the top of the cell stack within a range in which the coolant inlet port has an inclination exceeding that of the second incline plane.

9. The middle- or large-sized battery pack case according to claim 1, wherein the end opposite to the coolant inlet port is spaced apart from the top of the cell stack by a height not greater than 10% of the height of the cell stack.

10. The middle- or large-sized battery pack case according to claim 9, wherein the end opposite to the coolant inlet port is spaced apart from the top of the cell stack by a height of 1 to 10 mm.

11. The middle- or large-sized battery pack case according to claim 1, wherein the unit cells are lithium secondary batteries.

12. The middle- or large-sized battery pack case according to claim 1, wherein the coolant discharge part has a uniform height with respect to a bottom of the cell stack.

13. The middle- or large-sized battery pack case according to claim 1, wherein the battery pack case is constructed in a structure in which a blowing fan is further mounted in the coolant inlet port or the coolant outlet port for moving the coolant, introduced through the coolant inlet port, to the coolant outlet port, after the coolant flows through the battery module.

14. A middle- or large-sized battery pack constructed in a structure in which a battery module is mounted in a middle- or large-sized battery pack case of claim 1.

15. The middle- or large-sized battery pack according to claim 14, wherein the battery pack is used as a power source for electric vehicles or hybrid electric vehicles.

* * * * *